(12) United States Patent
King

(10) Patent No.: US 6,304,751 B1
(45) Date of Patent: Oct. 16, 2001

(54) CIRCUITS, SYSTEMS AND METHODS FOR DIGITAL CORRECTION OF PHASE AND MAGNITUDE ERRORS IN IMAGE REJECT MIXERS

(75) Inventor: Eric Jerome King, Greensboro, NC (US)

(73) Assignee: Cirrus Logic, Inc.

( * ) Notice: Subject to any disclaimer, the term of this patent is extended or adjusted under 35 U.S.C. 154(b) by 0 days.

(21) Appl. No.: 09/222,028

(22) Filed: Dec. 29, 1998

(51) Int. Cl.[7] ........................................ H04B 1/10
(52) U.S. Cl. .................... 455/306; 455/302; 455/324; 375/350
(58) Field of Search ................... 455/304, 305, 455/306, 307, 324, 302, 303; 375/316 324, 350, 261

(56) References Cited

U.S. PATENT DOCUMENTS

| | | | |
|---|---|---|---|
| 5,052,050 | * 9/1991 | Collier et al. ................. | 455/296 |
| 5,067,140 | 11/1991 | Weinert ............................. | 375/321 |
| 5,159,710 | * 10/1992 | Cusdin ................................ | 455/304 |
| 5,557,642 | * 9/1996 | Williams ............................ | 375/316 |
| 5,610,948 | * 3/1997 | Ninomiya ........................... | 375/324 |
| 5,812,927 | 9/1998 | Ben-Efraim et al. ............. | 455/324 |

\* cited by examiner

*Primary Examiner*—William Trost
*Assistant Examiner*—Rafael Perez-Gutierrez
(74) *Attorney, Agent, or Firm*—James J. Murphy, Esq.; Winstead Sechrest & Minick

(57) ABSTRACT

Imager rejection circuitry includes a first digital path including a finite impulse response filter 202 having a variable gain stage 204 operable to apply a gain to a first digital signal in response to a coefficient selected from a coefficient table 206 and an adder 205 for summing the first digital signal to the output of the variable gain stage 205 to produce a corrected first digital signal. A second digital path processes a second digital signal and error calculation circuitry 207 determines an error between the first and second signals for selecting a coefficient from the coefficient table 206.

21 Claims, 1 Drawing Sheet

CIRCUITS, SYSTEMS AND METHODS FOR DIGITAL CORRECTION OF PHASE AND MAGNITUDE ERRORS IN IMAGE REJECT MIXERS

BACKGROUND OF THE INVENTION

1. Field of the Invention

The present invention relates in general to wireless communications and in particular to circuits, systems and methods for correction of phases and magnitude errors im image reject mixers.

2. Description of the Related Art

In conventional wireless communications systems, data is transmitted by modulating a carrier signal at a frequency $f_c$ using any one of a number of well known modulation techniques, for example phase shift keying or frequency shift keying. This signal typically represents a single channel in a multiple channel frequency band allocated for the particular application or purpose. After receipt by the receiver antenna, the modulated signal is typically passed through a low noise amplifier to improve the overall receiver noise figure and then through a front end filter. The signal next is either upconverted or downconverted using one or more mixing stages to a desired frequency which can more easily be processed. In a digital receiver, this processing includes analog to digital conversion following any analog processing, such as analog filtering.

The mixing taking place during up- or down-conversion mixes the received signal with a local oscillator signal at a desired local oscillator frequency $f_{lo}$. The result is multiple intermediate frequency (IF) signals, for example one at $f_c+f_{lo}$ and another at $f_c-f_{lo}$. One of these signals is the desired signal and the other is its image. The image, along with $f_{lo}$ and various subharmonics resulting from the mixing are filtered out, for example using preselection filtering. While this type of system if suitable for narrow band applications, it is not practical in wide band applications where the image could fall in the band of interest and appear as a legitimate signal.

In some wideband applications, image rejection mixers are commonly used. In an image rejection mixer, the incoming signal is mixed with the local oscillator signal and in parallel with the local oscillator signal shifted by ninety (90) degrees. The resulting in-phase (I) and quadrature (Q) signals together represent a complex signal (with I the real part and Q the complex part) which is for further processing (in a digital receiver these signals are normally sent on a pair of analog to digital converters (ADCs)).

Image rejection mixers have some serious limitations. Among other things, to achieve acceptable levels of image rejection, the pair of mixers must be closely matched in output amplitude and phase. Even a very small mismatch of 1% or less in amplitude or phase across the entire band can cause the image amplitude to rise significantly within the complex signal. This degree of matching is impractical to implement in most systems.

Some current image rejection schemes down-convert each channel in the given frequency band to baseband on an individual basis. Magnitude and phase errors between the I and Q components can then be corrected at lower frequencies where filter matching is less critical. This however requires one or more variable frequency local oscillators and corresponding loop filters, at either the RF or IF conversion stages, for mixing each channel of interest to baseband. In other words, in these systems, the entire band of interest (containing many potential channels) cannot be converted with a fixed local oscillator while maintaining satisfactory image rejection.

Therefore, a need has arisen for circuits, systems and methods for maintaining high image rejection in broadband wireless applications.

SUMMARY OF THE INVENTION

Image rejection circuitry is disclosed including a first digital path having a finite impulse response filter having a variable gain stage operable to apply a gain to a first digital signal in response to a coefficient selected from a coefficient table and an adder for summing the first signal to the output of the variable gain stage to produce a corrected first digital signal. A second digital path is disclosed for processing a second digital signal along with error calculation circuitry for determining an error between the first and second signals and selecting the coefficient from the coefficient table.

The present inventive concepts allow for maintaining high image rejection in broadband wireless systems. Among other things, these concepts allow an entire multiple channel band to be downconverted in response to one or more fixed frequency local oscillators. Moreover, the RF to IF conversion stage can be eliminated if desired and only a single image rejection mixer used at the receiver front-end.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
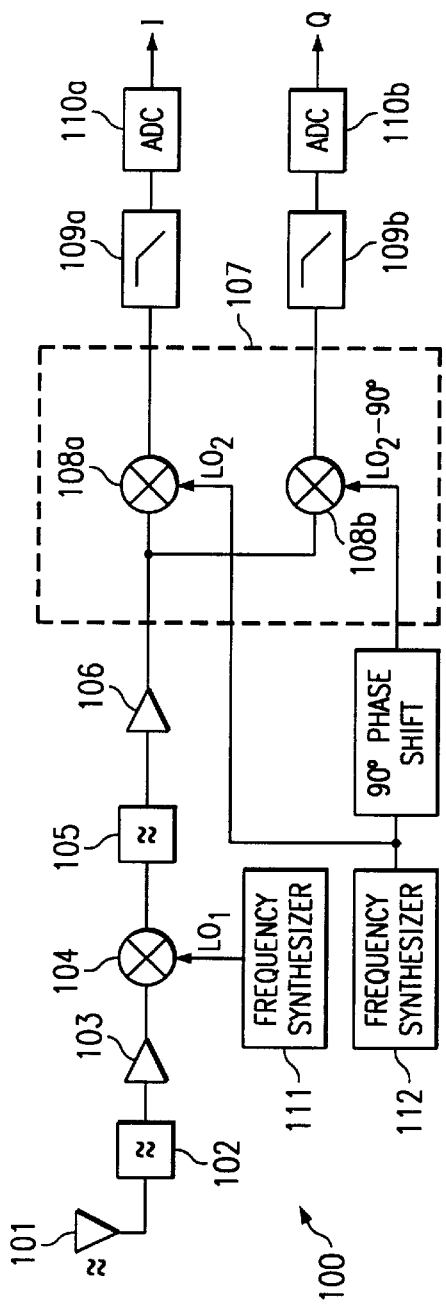
FIG. 1 is a diagram depicting the major components of a typical radio frequency or microwave (collectively "RF") receiving.

FIG. 1 is a diagram depicting the major components of a typical radio frequency or microwave (collectively "RF") receiving system 100. Systems similar to this are used in such applications as cellular telephone systems and other wireless communications systems. Modulated signals carrying information in the RF or microwave bands are received through an appropriately tuned antenna 101. A preselector filter 102 is used to filter out the band of interest from extraneous noise and signals, as well as, among other things, reduce the response of the receiver to the image frequency, the intermediate frequency and spurious noise and signals. The output of filter 102 is passed through a low noise amplifier to improve the overall noise figure of system 100.

RF mixer 104, in a down-converter receiver, mixes the RF signal at frequency $f_{RF}$ with a first local oscillator (LO) signal at a frequency $f_{LO1}$. The result is a signal at a desired intermediate frequency (IF) along with its image, and a corresponding number of subharmonics. Filter 105 alternates the image, subharmonics and noise and passes the IF signal for further amplification at stage 106.

In a downconverter system, the IF signal is next brought down to the baseband frequency using a image rejection mixer 107. Specifically, the IF signal is split between two mixers 108a and 108b, with mixer 108a mixing the IF signal with a second LO signal at a frequency of $f_{LO2}$ to generate an in-phase signal I and mixer 108b mixing the IF signal with the second LO signal shifted by 90 degrees in phase to generate an out-of-phase signal Q. These two signals combined compose a complex signal having an image attenuated to a given level by cancellation. The I and Q signals are then sent in parallel through a matched pair of low pass filters 109a and 109b and analog to digital converters (ADCs) 110 at the front end of the digital processing section of the system.

The system shown in FIG. 1 is suitable for narrow band systems. However, in high bandwidth systems problems arise due to insufficient image rejection. Mismatching between low pass filters 109a and 109b, mixers 108a and 108b and ADCs 110a and 110b, can cause phase and magnitude errors between the I and Q paths. Consequently, the image cancellation is reduced and an image of an unacceptably high level arises in the complex I/Q composite signal. Assume for example that the RF signal is any one of a number of channels in an 80 Mhz band on a 2.4 Ghz carrier. To achieve image rejection of 50 db or greater for any channel across the 80 Mhz band, and if low pass filters 109 are selected to be second order filters, the poles of the filters must be matched to approximately 0.1%. Filter matching to this degree is too difficult to achieve for practical applications. Moreover, in order to tune into each channel separately for RF to baseband down conversion, the source of local oscillator signals $LO_1$ and/or $LO_2$ must be frequency variable. For example, frequency synthesizer 111 and 112 or similar frequency variable local oscillator sources are necessary.

Figure 2:
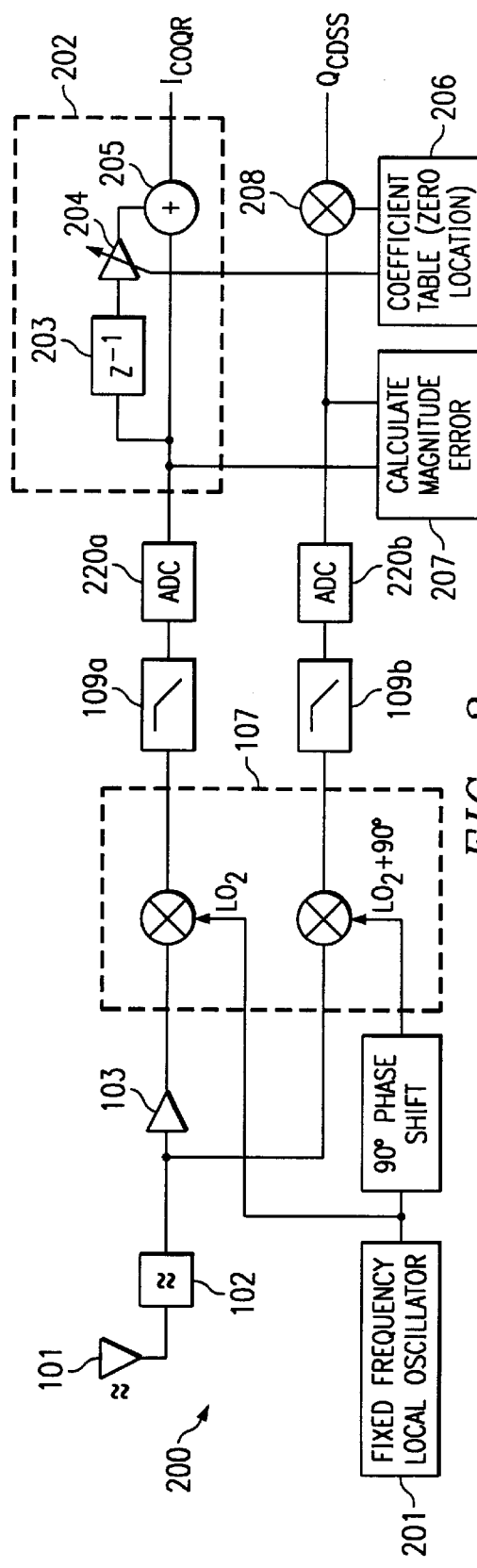
FIG. 2 is a diagram of an exemplary wireless receiving system embodying the present inventive concepts.

FIG. 2 is a diagram of an exemplary RF receiving system 200 embodying the present inventive concepts. System 200 can advantageously be used in a wide variety of wireless systems, including cellular communications, wireless local area networks (LANs), consumer electronics, etc. In this example the RF to IF conversion stage is not used, with the amplified and filtered RF signal being passed directly to the image reject mixer 107. Because of the inventive concepts, the image rejection at the digital processing stage can be sufficiently high even for broadband applications, such that even direct RF to baseband down-conversion is possible. If desired, or if the application requires it, RF to IF down-conversion can still be used in systems embodying the present invention. Moreover, the improvement in image rejection across the entire band allows that entire band to be down converted at once using fixed frequency local oscillator 201.

Again, the outputs from the image rejection mixer are passed through low pass filters 109a and 109b and then converted to digital form by ADCs 220. The I and Q signals, output from ADCs 220 represent the real and complex components of a complex wave function.

The I output from ADC 220a is passed through a finite impulse response (FIR) filter 202 which includes a single delay element 203, a variable gain stage 204, and an adder 205. In this embodiment, delay element delays the digitized signal by one period of the sampling clock used in the analog to digital conversion process by ADCs 220. The variable gain stage 204, which could be a shifter, adder or submultiplier, corrects the phase and magnitude errors (caused by magnitude and/or phase differences between the I and Q paths) in the complex signal by moving the zero of FIR filter 202 as close as possible to the origin of the unit circle in the complex plane defined by complex signal. The gain in variable gain stage 204 set in response to FIR filter coefficient selected from a coefficient lookup table 206, discussed further below. Specifically, the coefficient is used to add or subtract a value from the I component approximately equal to the magnitude difference between the I and Q paths measured at a given frequency during a calibration sequence. The direct I component from gain stage 204 is added by adder 205 to the delayed I component directly from ADC 110a to arrive at the corrected component $I_{corr}$.

The uncorrected Q component out ADC 220b is compared in magnitude with the unfiltered I component out of ADC 220a by error calculation circuitry 207 to determine the magnitude error between the uncorrected I and Q paths discussed above, for example through a digital subtraction operation. The calculated magnitude error is then used to lookup a corresponding coefficient from coefficient table 206 for use by variable gain stage 204. Concurrently, a coefficient is selected from the lookup table to correct DC gain in the uncorrected Q path. In particular, the uncorrected output from ADC 220b is multiplied by a multiplier 208 by the retrieved coefficient to set the DC gain at a desired value and produce a corrected Q signal Qcorr.

Although the present invention and its advantages have been described in detail, it should be understood that various changes, substitutions and alterations can be made herein without departing from the spirit and scope of the invention as defined by the appended claims.

What is claimed is:

1. A method for correcting for output phase and magnitude imbalances between digitized in-phase and quadrature outputs of an image rejection mixer comprising the steps of:
   measuring a magnitude imbalance between the in-phase and quadrature outputs of the image rejection mixer;
   selecting a stored coefficient in response to said step of measuring;
   setting a zero of a finite impulse response filter with the selected coefficient; and
   passing the in-phase output of the image rejection mixer through the finite impulse response filter to attenuate an image in a complex signal comprising in-phase and quadrature components,
   wherein said step of passing the in-phase output through the finite impulse response filter comprises the substeps of:
   passing the in-phase output through a delay element;
   adjusting the gain of the in-phase output to a level determined by the selected coefficient; and
   adding an output of the variable gain stage to the in-phase output of the image rejection mixer.

2. Image rejection circuitry for attenuating images in a complex signal output from an image rejection mixer comprising:
   a table for storing a set of coefficients;
   circuitry for determining a magnitude difference between uncorrected in-phase and quadrature components of the complex signal output from the image rejection mixer and selecting coefficients from the table in response;
   a finite impulse response filter for filtering the uncorrected in-phase component in response to a coefficient selected from the coefficient table to correct for phase and magnitude imbalance between the in-phase and quadrature components output from the image rejection mixer; and
   circuitry for modifying the uncorrected quadrature component to correct a DC gain in the complex signal.

3. The image rejection circuitry of claim 2 wherein the finite impulse response filter comprises:
   a delay element for delaying the uncorrected in-phase component;

a variable gain element for adjusting the magnitude of the output of the delay element in response to the selected coefficient; and a summer for adding the output of the variable gain element with the uncorrected in-phase component to generate a corrected in-phase component.

4. The image rejection circuitry of claim 3 wherein the selected coefficient is selected to move a zero of the finite impulse response filter.

5. The image rejection circuitry of claim 2 wherein the circuitry for modifying the uncorrected quadrature signal comprises a multiplier for multiplying the uncorrected quadrature component output from the image rejection mixer with a second coefficient selected from the coefficient table to generate a corrected quadrature signal.

6. A wireless system comprising:

an image rejection mixer for converting a received broadcast signal at a first frequency to a complex signal at a second frequency;

analog to digital conversion circuitry for converting the complex signal into digital form, the complex signal comprising real and complex components;

storage circuitry for storing data for selectively attenuating an image of the complex signal;

circuitry for calculating a magnitude difference between the real and complex components and selecting corresponding data from the storage circuitry; and a finite impulse response filter having a zero set by the selected data for filtering the real component of the complex signal to attenuate the image of the complex signal.

7. The wireless system of claim 6 wherein the received broadcast signal comprises a band of frequencies and the image rejection mixer converts the entire band from the first frequency to the second frequency.

8. The wireless system of claim 6 and further comprising a multiplier for multiplying the complex component by data from the storage circuitry to set a DC gain for the complex signal.

9. The wireless system of claim 6 wherein the image rejection mixer downconverts the received broadcast signal directly to a selected baseband frequency.

10. The wireless system of claim 6 wherein the image rejection mixer operates in response to a fixed local oscillator frequency.

11. The wireless system of claim 6 wherein the wireless system comprises a wireless local area network system.

12. The wireless system of claim 6 wherein the wireless system comprises a wireless communications system.

13. Image rejection circuitry comprising:

a first digital path including a finite impulse response filter having a variable gain stage operable to apply a gain to a first digital signal in response to a coefficient selected from a coefficient table and an adder for summing the first digital signal to the output of the variable gain stage to produce a corrected first digital signal;

a second digital path for processing a second digital signal;

error calculation circuitry for determining an error between the first and second signals for selecting the coefficient from the coefficient table; and wherein the second digital path comprises a multiplier for multiplying the second digital signal with a coefficient selected from a coefficient table to produce a corrected second digital signal.

14. A method for correcting for output phase and magnitude imbalances between digitized in-phase and quadrature outputs of an image rejection mixer comprising the steps of:

measuring a magnitude imbalance between the in-phase and quadrature outputs of the image rejection mixer;

selecting a stored coefficient in response to said step of measuring;

setting a zero of a finite impulse response filter with the selected coefficient;

passing the in-phase output of the image rejection mixer through the finite impulse response filter to attenuate an image in a complex signal comprising in-phase and quadrature components; and setting a DC gain for the complex signal by correcting the quadrature output.

15. The method of claim 14 further comprising the steps of:

receiving a band of signals comprising a plurality of information channels;

generating analog in-phase and quadrature signals for the band in an analog image rejection mixer using a fixed frequency local oscillator for frequency conversion; and digitizing the analog in-phase and quadrature signals to produce the digitized in-phase and quadrature outputs.

16. The method of claim 15 wherein said step of generating analog in-phase and quadrature signals comprises the substep of converting the received band of signals to baseband in a single mixing step.

17. The method of claim 14 wherein said step of setting a DC gain comprises the step of multiplying the quadrature output with a coefficient selected during said step of measuring a mismatch.

18. Image rejection circuitry comprising:

a first digital path including a finite impulse response filter having a variable gain stage operable to apply a gain to a first digital signal in response to a coefficient selected from a coefficient table and an adder for summing the first digital signal to the output of the variable gain stage to produce a corrected first digital signal;

a second digital path for processing a second digital signal;

error calculation circuitry for determining an error between the first and second signals for selecting the coefficient from the coefficient table; and wherein the finite impulse response filter includes a delay element in series with an input of the variable gain stage.

19. The image rejection circuitry of claim 18 wherein the error calculation circuitry determines an error difference in magnitude between the first and second signals.

20. The image rejection circuitry of claim 18 wherein the second digital signal is out of phase with the first digital signal by a preselected number of degrees.

21. The image rejection circuitry of claim 20 wherein the selected number of degrees is approximately ninety.

* * * * *